(12) United States Patent
Dahl et al.

(10) Patent No.: US 7,879,377 B2
(45) Date of Patent: Feb. 1, 2011

(54) PET SNACK

(75) Inventors: Stephen R. Dahl, Manchester, MO (US); Donald R. Speck, Festus, MO (US)

(73) Assignee: Nestec, Ltd., Vevey (CH)

( * ) Notice: Subject to any disclaimer, the term of this patent is extended or adjusted under 35 U.S.C. 154(b) by 2283 days.

(21) Appl. No.: 10/434,602

(22) Filed: May 9, 2003

(65) Prior Publication Data
US 2003/0228400 A1 Dec. 11, 2003

Related U.S. Application Data

(63) Continuation-in-part of application No. 29/159,277, filed on Apr. 18, 2002, now Pat. No. Des. 478,705.

(51) Int. Cl.
*A23G 1/00* (2006.01)
(52) U.S. Cl. .................. 426/282; 426/249; 426/274; 426/514; 426/805
(58) Field of Classification Search .......... 426/249, 426/274, 514, 805
See application file for complete search history.

(56) References Cited

U.S. PATENT DOCUMENTS

| | | | |
|---|---|---|---|
| D10,882 S | 10/1878 | Mills | |
| D11,173 S | 4/1879 | Mills | |
| 1,714,234 A | 5/1929 | Ost | |
| 3,188,264 A * | 6/1965 | Holden | 206/584 |
| 4,118,512 A * | 10/1978 | Eichelburg | 514/773 |
| 4,504,511 A | 3/1985 | Binley | |
| 4,524,081 A * | 6/1985 | Bansal | 426/249 |
| 4,786,243 A * | 11/1988 | Kehoe | 425/131.1 |
| 4,879,126 A | 11/1989 | Willard et al. | |
| 5,120,554 A * | 6/1992 | Farnsworth et al. | 426/282 |
| 5,283,070 A * | 2/1994 | Bertrand et al. | 426/249 |
| 5,292,472 A | 3/1994 | Tompkins | |
| 5,518,749 A | 5/1996 | Weinstein | |
| 5,620,641 A * | 4/1997 | Berger | 264/103 |
| 5,670,185 A * | 9/1997 | Heck et al. | 425/133.1 |
| 5,695,805 A * | 12/1997 | Borek et al. | 426/620 |
| 5,728,418 A | 3/1998 | Hauser et al. | |
| D401,735 S | 12/1998 | Rom | |
| 5,874,120 A * | 2/1999 | Borek et al. | 426/500 |
| 6,136,360 A * | 10/2000 | Tsuchida et al. | 426/500 |
| 6,296,465 B1 | 10/2001 | Deutsch et al. | |
| 6,428,830 B1 * | 8/2002 | Matthews et al. | 426/92 |
| 6,455,083 B1 * | 9/2002 | Wang | 426/104 |
| 6,626,660 B1 * | 9/2003 | Olson et al. | 425/190 |
| 6,733,263 B2 * | 5/2004 | Pope et al. | 425/131.1 |
| 6,905,703 B2 * | 6/2005 | Rothamel et al. | 424/439 |

OTHER PUBLICATIONS

Rawhide Twists on pp. 1 and 2 from :<URL: http://www.i-pets.com/rawhide2.html © 1998-2002, retrieved from the Internet Oct. 2, 2002.

* cited by examiner

*Primary Examiner*—C. Sayala
(74) *Attorney, Agent, or Firm*—K&L Gates LLP (57) ABSTRACT

Pet food products and methods of manufacture are provided, the pet food product comprising a helical body having a first material formed to include an outer surface, and a second material having a striping portion deposited on the outer surface of the first material and positioned to lie along a length of the first material, the pet food product optionally having a stuffing portion positioned within a cavity in the first material. Illustratively, the second material has a composition that provides lubrication during an extrusion process to manufacture the food product.

16 Claims, 5 Drawing Sheets

PET SNACK

CROSS-REFERENCE TO RELATED APPLICATION

This application is a continuation-in-part of U.S. patent application Ser. No. 29/159,277, filed Apr. 18, 2002 now U.S. Pat. No. D,478,705, herein incorporated by reference.

FIELD OF THE INVENTION

The present disclosure relates to methods and compositions for food products. More particularly, this disclosure relates to twisted, stuffed, striped, and extruded food products for use as pet snacks.

BACKGROUND AND SUMMARY OF THE INVENTION

Food products are commonly prepared using an extrusion process. It is known to make twisted and stuffed food products by extrusion using a rotary die. However, due to the high pressures and temperatures needed to produce a twisted, stuffed, striped, and extruded food product at a high rate of speed, processes for producing twisted, stuffed, striped and extruded food products have proven to be problematic.

U.S. Pat. Nos. 5,518,749 and 5,670,185 teach rotary die assemblies. U.S. Pat. No. 5,518,749 teaches cooling of the rotating die assembly, to prevent the material from becoming too hot, smoking, or burning. U.S. Pat. No. 5,518,749 uses a circulating coolant in the die assembly. U.S. Pat. No. 5,670,185 teaches an alternative sealing material and a low revolutions per minute to prevent the material from becoming too hot, smoking, or burning.

In the present disclosure, a twisted, stuffed, striped, and extruded food product is provided. The food product is striped with an edible material having a lipid content sufficient to provide lubrication for the rotating die. Because the striping material is provided as a thin layer, the overall fat content of the extruded product need not be high, and because the striping material is provided on the exterior of the extruded product, the product may be extruded at a high rate of speed, while reducing or eliminating the need for cooling of the food material in the rotating die during the extrusion process. Illustratively, the twisted, stuffed, striped, and extruded food product is a pet treat. In one embodiment, the pet treat includes a first material flavored and colored to resemble beef, bacon, or other meat, and a second material flavored and colored to resemble cheese. Illustratively, the second material has a fat content sufficient to lubricate the rotating die. The second material is striped onto the first material during the extrusion process. Illustratively, in addition to being striped onto the first material, the second material is stuffed into the first material. The resultant extruded product has the appearance of a twisted, stuffed, and striped meat-flavored treat, having a cheese-flavored core and a cheese flavored striping.

Additional features of the present invention will become apparent to those skilled in the art upon consideration of the following detailed description of the preferred embodiments.

BRIEF DESCRIPTION OF THE DRAWING

The detailed description particularly refers to the accompanying figures in which.

DETAILED DESCRIPTION

A pet food product 10 is provided as a treat for pets, such as dogs, for example. Pet food product 10, as shown in FIGS. 1-6, includes a first material or extrudate material 12 and a second material or stuffing/striping material 14. First and second materials 12, 14 are processed through a die assembly 56, shown in FIGS. 8-10, to produce the helically twisted, stuffed, and striped pet food product shown in FIGS. 1-7. Illustratively, extrudate material 12 has a composition having a red color and a beef flavoring, to simulate a beef portion of pet food product 10. Stuffing/striping material 14 illustratively has a composition having a yellow color and a substantially smooth finish to simulate a cheese portion of pet food product 10. As is discussed in greater detail below, the composition of each of the first and second materials 12, 14 of pet food product 10 are sufficiently malleable to be formed into the helical shape and structure of pet food product 10. It is understood that the term "striping" as used herein and in the appended claims is intended to be defined as a means to variegate with a long narrow section differing in color or texture from parts adjoining generally transverse to the longitudinal axis direction of product 10.

Figures 1, 2, 4, 5, 6:
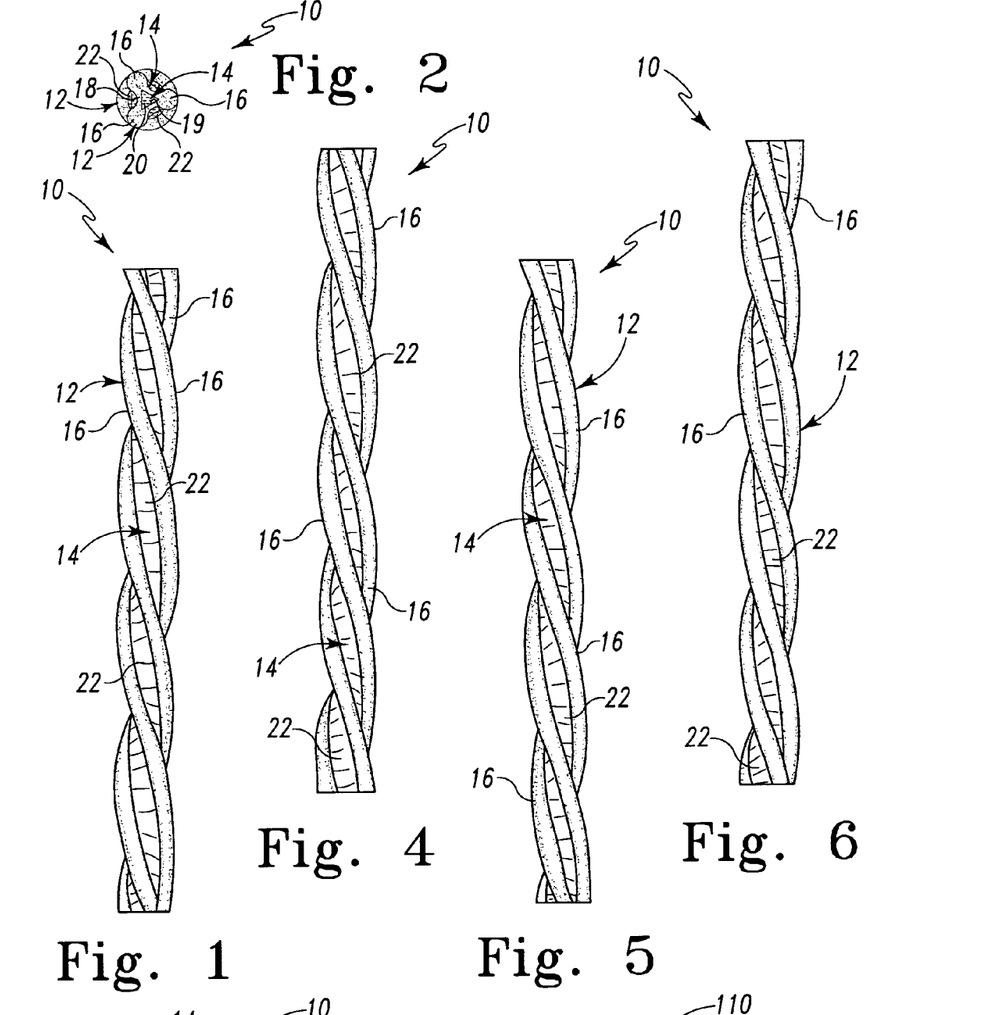
FIG. 1 illustrates a front view of a pet food product of the present disclosure showing the pet food product having a helical structure and including a first, extrudate material and a second, striped and stuffed material.
FIG. 2 illustrates a top end view of the pet food product shown in FIG. 1 showing the two different materials of the pet food product.
FIG. 4 illustrates a rear view of the pet food product shown in FIGS. 1-3.
FIG. 5 illustrates a right side view of the pet food product shown in FIGS. 1-4.
FIG. 6 illustrates a left side view of the pet food product shown in FIGS. 1-5.
Figure 3:
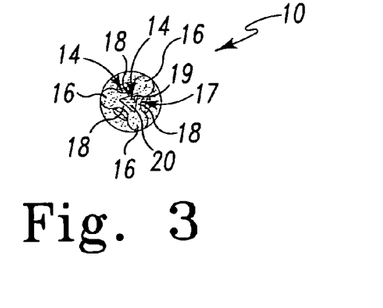
FIG. 3 illustrates a bottom end view of the pet food product shown in FIGS. 1 and 2.

As shown best in FIGS. 2 and 3, the first material or extrudate material 12 forms generally a triangular or "Y" shape having three lobes 16, illustratively about 120° apart, and a connecting portion 18 between each lobe 16. First, extrudate material 12 forms a central, hollow area or channel 19 to be filled with a stuffing portion 20 of the stuffing/striping material 14. Stuffing/striping material 14 also forms a striping portion 22, shown best in FIG. 1. Illustratively, stuffing portion 20 is contained within the hollow area 19 formed by extrudate material 12 and is mostly or completely surrounded by extrudate material 12. Striping portion 22 of stuffing/striping material 14 is provided on an outer surface of each connecting portion 18 of extrudate material 12. In an alternative embodiment, striping portion 22 is provided on a single outer surface of extrudate material 12. In a further alternative embodiment, striping portion 22 is provided on two outer surfaces of extrudate material 12. A valley 17 provided between each lobe 16 provides sufficient space for striping portion 22 of stuffing/striping material 14. In one embodiment, therefore, extrudate material 12 of pet food product 10 is both stuffed with the stuffing/striping material 14 and is striped with stuffing/striping material 14. As is discussed in greater detail below, striping material 22 of pet food product 10 acts as a lubricant during an extrusion process for producing pet food product 10. In one embodiment, stuffing portion 20 and striping portion 22 are comprised of the same stuffing/striping material 14. However, it is understood that stuffing portion 20 may be comprised of materials different from the materials of striping portion 22. It is understood that the terms "lubricate" and "lubrication" as used herein and in the appended claims are intended to be defined as a means to reduce friction.

Figure 7:
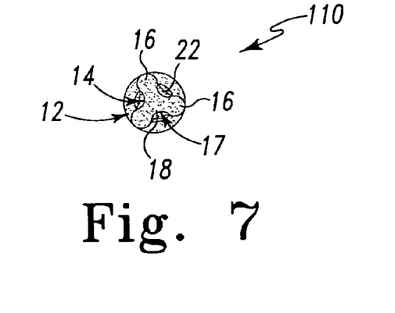
FIG. 7 illustrates an end view of an alternative embodiment of the pet food product of the present disclosure showing the alternative pet food product similarly comprising two different materials.

As another embodiment, an alternative pet food product 110 is shown in FIG. 7. Product 110 is similar to product 10 and thus the same reference numerals have been provided to refer to portions of product 110 which are the same or similar to portions of product 10. Product 110 similarly includes extrudate material 12 and stuffing/striping material 14. Further, product 110 is similarly helical in shape. However, alternative pet food product 110 does not include stuffing portion 20 of stuffing/striping material 14. First, beef-flavored extrudate material 12 of product 110 is generally "Y-shaped" and does not form the hollow area 19 of pet food product 10. However, because product 110 is provided with exterior striping of stuffing/striping material 14, the extrusion process to produce product 110 has been aided by the lubricating properties of stuffing/striping material 14.

In pet food product 10, extrudate material 12 includes three lobes 16 and three connecting portions 18 which connect each lobe 16 to an adjacent lobe 16. However, each connecting portion 18 of pet food product 110 is in communication with another connection portion 18, whereas each connecting portion 18 of pet food product 10 is spaced-apart from each other connecting portion 18 to form hollow portion 19. Similar to pet food product 10, striping portion 22 of pet food product 110 is deposited onto an outer surface of each connecting portion 18. In an alternative embodiment, striping portion 22 is provided on a single outer surface of extrudate material 12. In a further alternative embodiment, striping portion 22 is provided on two outer surfaces of extrudate material 12. Pet food product 110 is made in a similar manner as pet food product 10, as is discussed below.

Figure 8:
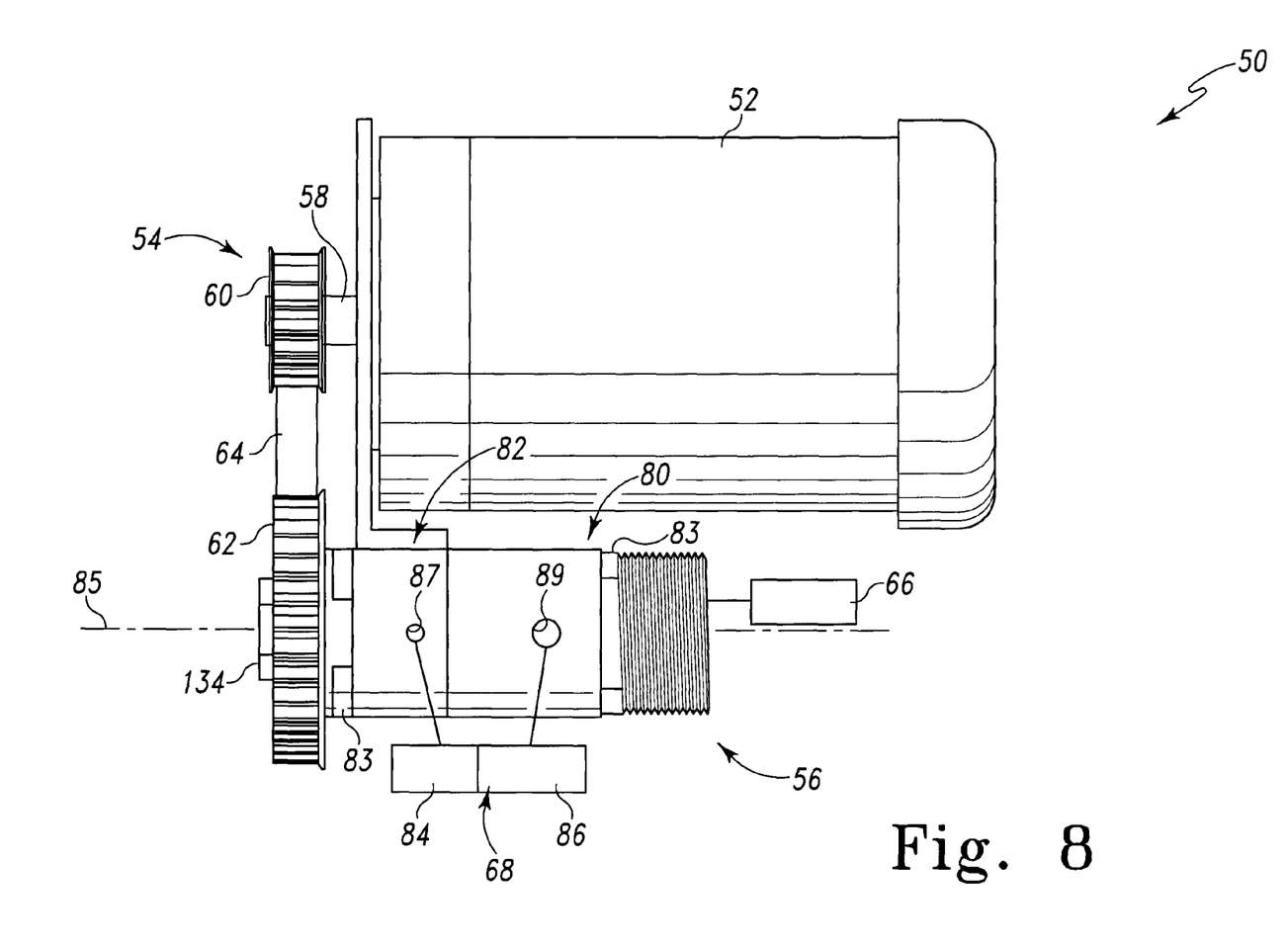
FIG. 8 illustrates a part schematic, part diagrammatic view of a motor and rotating die assembly combination for manufacturing the pet food products shown in FIGS. 1-7.

FIG. 8 depicts a motor and rotating die assembly 50 for manufacturing pet food product 10. Motor and rotating die assembly 50 includes a motor 52, a pulley system 54 coupled to motor 52, and a rotating die assembly 56 coupled to pulley system 54.

A shaft 58 of motor 52 is coupled to a first motor pulley 60 of pulley system 54 to cause first pulley 60 to rotate with shaft 58. Pulley system 54 further includes a second pulley 62 coupled to first pulley 60 by pulley drive belt 64. In general, motor 52 drives pulley system 54 which drives rotating die assembly 56. As is discussed in greater detail below, the first material or extrudate material 12 is injected into die assembly 56 from a first product source 66 and stuffing/striping material 14 is injected into die assembly 56 from a second product source 68.

Die assembly 56 includes a stationary subassembly 80, a rotating subassembly 82, rotating die insert 114 (Shown in FIG. 9) and fastener bolts 83. Stationary subassembly 80 is coupled to a rotating subassembly 82 via fastener bolts 83. Rotating die insert 114 rotates relative to stationary subassembly 82 about a longitudinal axis 85 running through die assembly 56. As mentioned above, motor 52 is coupled to rotating subassembly 82 via pulley system 54 to rotate rotating die insert 114 relative to rotating subassembly 82. First product source 66 communicates with stationary subassembly 80. Second product source 68 is split into a first, striping portion 84 and a second, stuffing portion 86. Striping portion 84 is in communication with rotating subassembly 82 while stuffing portion 86 is in communication with stationary subassembly 80. As shown in FIG. 8, striping portion 84 of second product source 68 injects stuffing/striping material 14 into a striping inlet 87 of rotating subassembly 82. Stuffing portion 86 of second product source 68 injects stuffing/striping material 14 into a stuffing inlet 89 of stationary subassembly 80.

First product source 66 communicates with stationary subassembly 80. Second product source 68 is split into a first, striping portion 84 and a second, stuffing portion 86. Striping portion 84 is in communication with rotating subassembly 82 while stuffing portion 86 is in communication with stationary subassembly 80. As shown in FIG. 8, striping portion 84 of second product source 68 injects stuffing/striping material 14 into striping inlet 87 of rotating subassembly 82. Stuffing portion 86 of second product source 68 injects stuffing/striping material 14 into a stuffing inlet 89 of stationary subassembly 80.

Figure 9:
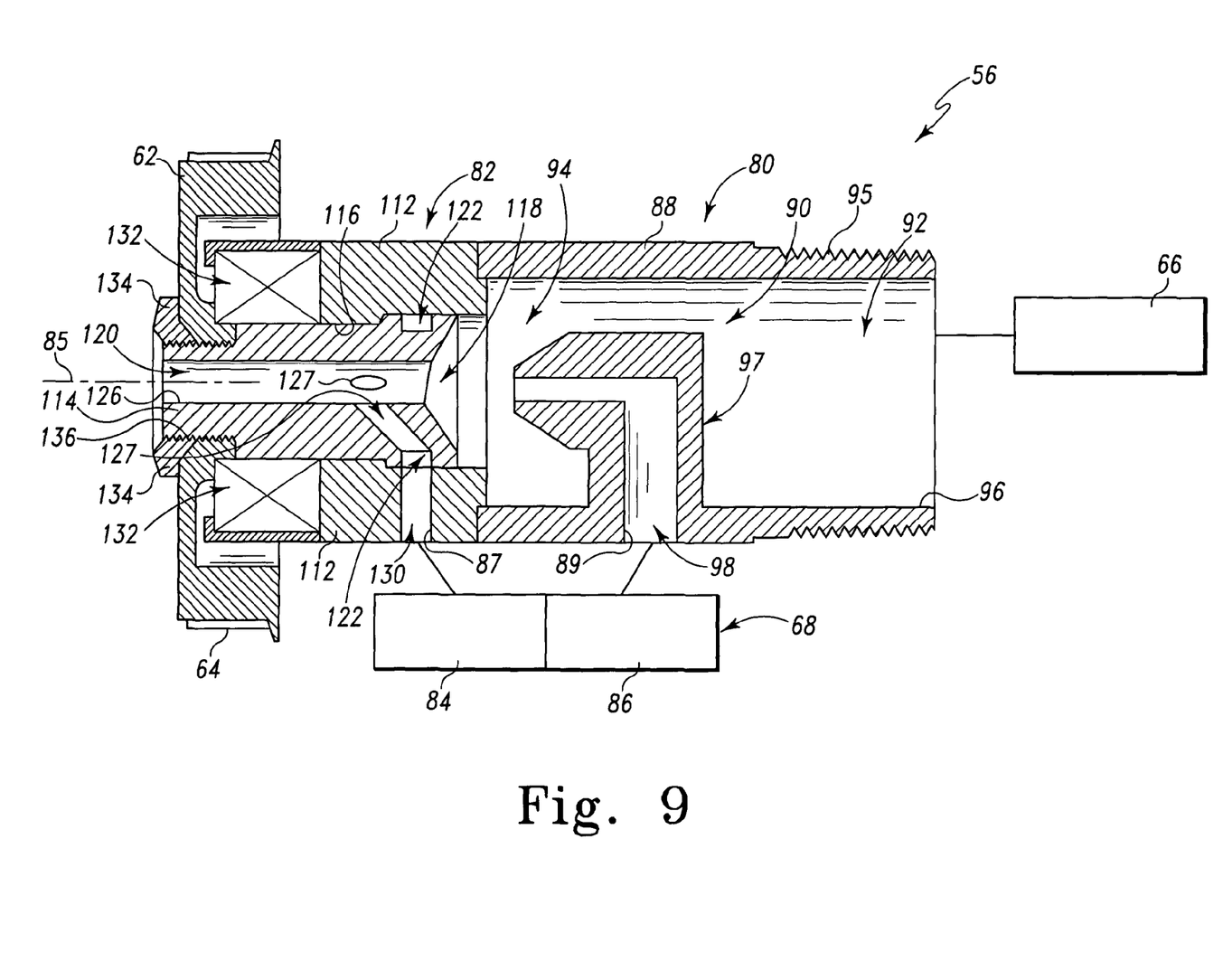
FIG. 9 illustrates a sectional view of the rotating die assembly shown in FIG. 8 taken along lines A-A of FIG. 10.

FIG. 9 depicts stationary subassembly 80 that includes a main body 88 formed to define an inner chamber 90 having a first chamber portion 92 and a second chamber portion 94. A threaded portion 95 of main body 88 defines a first aperture 96 of main body 88 and is in communication with first chamber portion 92 and first product source 66. In operation, threaded portion 95 is coupled to an extruder 208 (shown diagrammatically in FIG. 11) which extrudes mixed preconditioned ingredients 192 to form extruded extrudate material 12.

Main body 88 also includes a nozzle 97 formed to define a passageway 98 in communication at one end with stuffing inlet 89 and at another end with second chamber portion 94. As mentioned above, stuffing/striping material 14 is injected into stuffing inlet 89 from second portion 86 of second product source 68 to enter stationary subassembly 80 and second chamber portion 94. Stuffing/striping material 14 injected through passageway 98 of nozzle 97 is injected downstream of extrudate material 12 and forms stuffing 20 of pet food product 10. In operation, therefore, second chamber portion 94 includes both stuffing 20 and extrudate material 12 around stuffing 20.

Rotating subassembly 82, as shown in FIG. 9, includes a stationary housing 112 and a rotating die insert 114 coupled to stationary housing 112 and positioned within an aperture 116 of stationary housing 112. A core chamber 118 of rotating subassembly 82 is in fluid communication with second chamber portion 94 of chamber 90 of stationary subassembly 80. Rotating die insert 114 includes a central channel 120 in communication with core chamber 118 at a first end and in communication with the surrounding atmosphere at an exit end.

Figure 10:
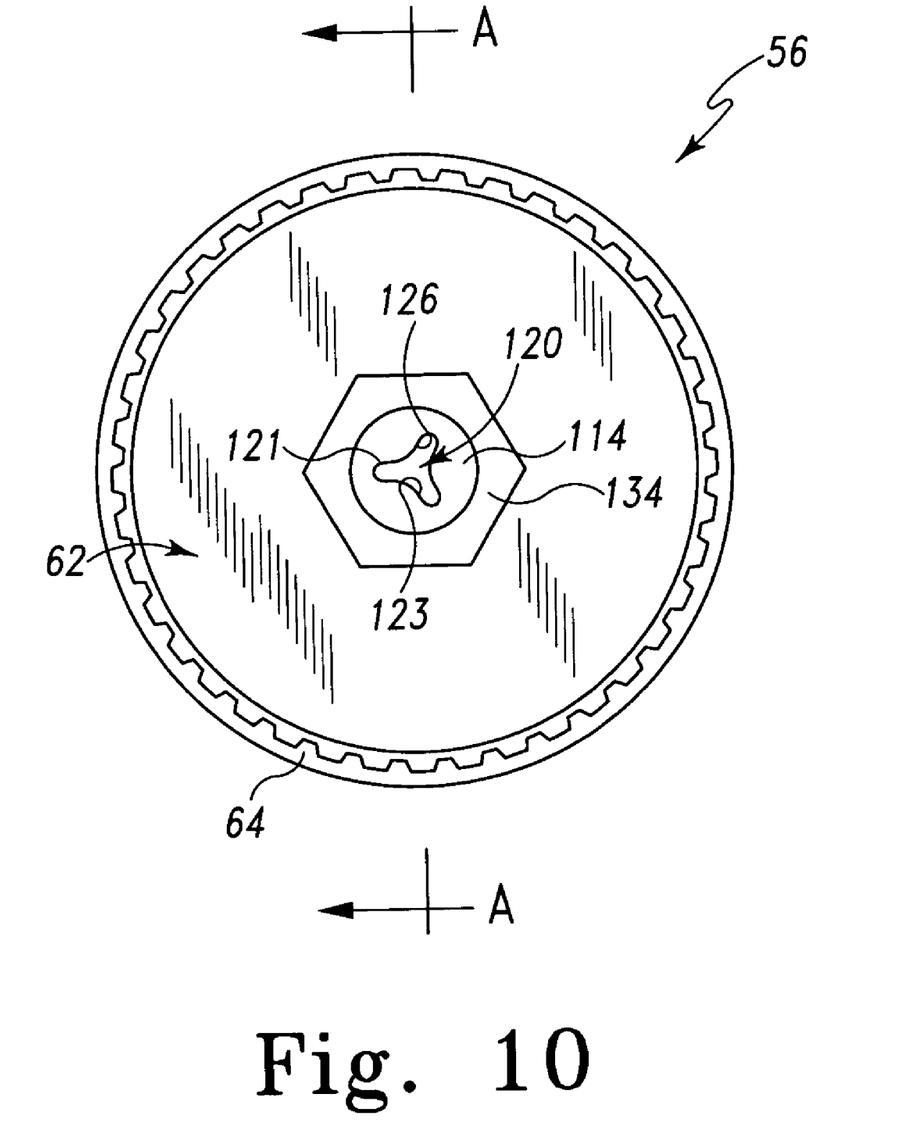
FIG. 10 illustrates a front view of the rotating die assembly.

As shown in FIG. 10, channel 120 of die insert 114 is somewhat "Y-shaped" in cross-section to define the shape of the final pet food product 10. An outer wall 126 which defines channel 120 is formed to include three lobes 121 as well as three connecting portions 123. Pet food product 10 is therefore formed to have this Y-shaped cross-section, thus forming the lobe portions 16 and connecting portions 18 of extrudate material 12. Rotating die insert 114 may be formed to include other central channels having other shapes and/or sizes different from the Y-shaped cross-section of channel 120.

Rotating die insert 114 further includes an annular groove 122 formed in an outer surface of the first end of rotating die 114. Multiple striping channels 127 are formed within outer wall 126 of central channel 120 to communicate with annular grove 122. Specifically, three striping channels 127 are provided to add striping portion 22 of stuffing/striping material 14 to the outer surface of extrudate material 12 as the extrudate and stuffing travels from second chamber portion 94 into channel 120 of rotating die insert 114. Channel 120 is the final passageway of die assembly 56 through which extrudate material 12 and stuffing/striping materials 14 travel.

A channel 130 is formed through a portion of the stationary housing 112 of rotating subassembly 82 to communicate with annular groove 122. Channel 130 is in communication with first portion 84 of second source 68, as shown in FIG. 9. Stuffing/striping material 14 is injected through striping inlet 87 into channel 130 to fill annular groove 122 and to be dispensed through striping channels 127 to channel 120. Striping channels 127 are aligned with connecting portions 123 of outer wall 126 defining channel 120, to provide stuffing/striping material 14 in valleys 17 of extrudate material 12.

As shown in FIGS. 8 and 9, second pulley 62 is coupled to rotating die insert 114 to cause rotating die insert 114 to rotate. Bearing 132 is provided between rotating die insert 114 and a portion of stationary housing 112. Pulley 62 is secured to rotating die assembly 56 by a retaining nut 134 tightened onto a threaded portion 136 of rotating die insert 114.

As shown in both FIGS. 8 and 9, extrudate material 12 is inserted from an extruder (not shown) into first cavity portion 92 of cavity 90 of stationary subassembly 80 of die assembly 56. Outer striping material 22 of stuffing/striping material 14 is fed into the rotating subassembly 82 of die assembly 56 via striping inlet port 87. Stuffing portion 20 of stuffing/striping material 14 is fed into second chamber portion 94 of inner chamber 90 of stationary subassembly 80 via stuffing inlet 89 and channel 98 of nozzle 97.

Rotation of rotating die insert 114 about axis 85 imparts a twisting or helical shape on pet food products 10, 110. As mentioned above, rotation of die insert 114 is accomplished by driving several of the parts described above. Motor 52 drives motor pulley 60 of the pulley system 54 to drive the rotating die pulley 62 via the drive belt 64 which is looped around both the motor pulley 60 and the die pulley 62. Threaded shaft portion 136 of rotating die insert 114 extends through a central aperture of pulley 62. Illustratively, retaining nut 134 is threaded onto the threaded shaft portion 136 to attach pulley 62 to die assembly 56.

As mentioned above, channel 120 is illustratively Y-shaped, as shown in FIG. 10, to produce the generally Y-shaped cross-section of pet foot products 10, 110. Pet food product 110 is manufactured by a similar process as pet food product 10. To produce pet food product 110, for example, the step of inserting stuffing portion 20 of stuffing/striping material 14 into second portion 94 of chamber 90 via nozzle 97 is not necessary. Shown in FIG. 7, pet food product 110, does not include stuffing portion 20. However, striping portion 22 of stuffing/striping material 14 is similarly applied to connecting portions 18 of extrudate material 12, as described above, to produce pet food product 110.

As illustrated in FIGS. 1-7, at least two different food compositions, extrudate material 12 and stuffing/striping material 14, may be used to create final pet food products 10, 110. In one embodiment, extrudate material 12, may resemble meat, for example beef, bacon, turkey, chicken, pork, ham, lamb, poultry, or fish. Stuffing/striping material 14, may resemble cheese, peanut butter, garlic spreads, fruit spreads, vegetable spreads, herbal spreads, or a combination thereof. Where it is understood that the term "spreads" as used herein is and in the appended claims is intended to mean a material having the appearance, texture, and flavor of its main component, as an illustrative example, "fruit spreads" is intended to mean a material having a look and feel of a fruit jam. It is understood that other flavors may be used, and that stuffing portion 20 and striping portion 22 may, optionally, comprise different materials. In an alternative embodiment, extrudate material 12 may resemble cheese, peanut butter, garlic spreads, fruit spreads, vegetable spreads, herbal spreads, or a combination thereof. In a further alternative embodiment, stuffing/striping material 14 may resemble meat, for example beef, bacon, turkey, chicken, pork, ham, lamb, poultry, or fish. As illustrated, pet food products 10, 110 each have a Y-shaped cross-section, although treats having other cross-sections are within the scope of this invention. Stuffing/striping material 14 may be stuffed and/or striped into and onto extrudate material 12, which is then twisted, to provide a treat having the appearance as illustrated in FIGS. 1-7. Extrudate material 12 and stuffing/striping material 14 are prepared separately. As discussed above, extrudate material 12 is illustratively made to resemble meat. Accordingly, extrudate material 12 includes a protein source. In one embodiment the protein source is an animal protein source. In another embodiment, the protein source is a vegetable protein source. In a further embodiment, the protein source is a combination of an animal protein source and a vegetable protein. Suitable animal protein sources are muscular or skeletal meat of mammals, poultry, and fish; meals such as meat meal, bone meal, fish meal, lamb meal, and poultry meal; by-products such as hearts, liver, kidneys, tongue and the like; and milk proteins. Suitable vegetable protein sources include corn protein (e.g., ground corn or corn gluten), wheat protein (e.g., ground wheat or wheat gluten), soy protein (e.g., soybean meal, soy concentrate, or soy isolate), rice protein (e.g., ground rice or rice gluten) and the like. These proteins may be provided in the form of grains, meals, flours, concentrates, and isolates as desired.

In addition, extrudate material 12 includes a carbohydrate source that may include grains such as corn, rice, wheat, barley, oats, or soy, and mixtures of these grains. The grain is conveniently provided in the form of a flour or meal. Pure or substantially pure starches may also be used if desired. Alternatively, it is understood that the carbohydrate source may contain other components, such as protein.

Together with the protein source and carbohydrate source, one or more flavorings may be added. The flavoring may be added to produce a palatable flavor and suitable aroma. Because the concentration of flavorings vary greatly, the amount of flavoring used would vary as well. In one embodiment, a smoke flavoring is added. In another embodiment, trimmed beef gullets are included to provide a beef flavor. In yet another embodiment, bacon fat is included to provide a bacon flavor. In one embodiment, extrudate material 12 includes about 1% to about 5% bacon fat and less than 1% smoke flavoring in the finished product.

In addition to flavorings, dyes or food colorings may be added to provide a desired appearance. In the case of beef, a brown dye may be used, illustratively brown lake blend, whereas a red dye, illustratively a red lake blend, may be used to give the appearance of bacon. Various other dyes and food colorings are known in the art.

In one embodiment, stuffing/striping material 14 is made to resemble cheese. Stuffing/striping material 14 includes a carbohydrate source that may include grains such as corn, rice, wheat, barley, oats, or soy in a flour form and starches such as corn, rice, wheat, tapioca or potato as well as mixtures of these grains and starches. However, it has been found that a mixture of corn starch and wheat flour provides a smooth cheese-like texture. The greater the percentage of corn starch compared to the percentage of wheat flour, the smoother the texture. And the greater the percentage of wheat flour compared to the percentage of corn starch, the rougher the texture. In one embodiment, a ratio of approximately 3 parts corn starch to 1 part wheat flour provides a smooth, cheese-like texture.

Stuffing/striping material 14 also contains one or more fats and/or emulsifiers. The fat content in stuffing/striping material 14 provides lubrication for rotating die assembly 56. It has been found that inclusion of the fat content provides lubrication, with concomitant cooling effect, and allows for rotating die assembly 56 to rotate without the need for significant cooling of the material as the product travels through rotating die assembly 56. It has also been found that the fat content in stuffing/striping material 14 provides this benefit even in the absence of significant fat content in extrudate material 12. The fat and emulsifier also aid in producing a smooth, shiny texture that is suggestive of cheese. Suitable fats include animal fats, for example poultry fat and pork fat, and vegetable oils, including soybean oil, corn oil, cottonseed oil, sunflower oils, canola oil, peanut oil, and safflower oil. Other lipids may be used as well. Suitable emulsifiers include monoglyceride, diglyceride, glyceryl esters (i.e., glyceryl monostearate), polysorbates (i.e., polysorbate 60, 80), sorbitan esters (i.e., sorbitan monostearate), stearoyl lactylates (i.e., sodium stearoyl-2-lactylate), sucrose esters, and propylene glycol esters of fatty acids. Other fats and emulsifiers are known in the art. In one embodiment, stuffing/striping material 14 includes about 0.5% to about 6% tallow and less than 1% lecithin in the finished product 10, 110. In an illustrated embodiment, stuffing/striping material 14 (including stuffing portion 20 and striping portion 22) is provided as approximately ⅓ of the final extruded product, with extrudate material 12 making up the remaining ⅔ of the final extruded product. However, it is understood that the ratio of stuffing/striping material 14 and extrudate material 12 may vary, subject to the desired final appearance of the pet food product.

In one embodiment stuffing/striping material 14 looks like a cheese. This cheese look is obtained by utilizing suitable dyes, such as a blend of yellow dyes. In one embodiment, yellow lake #5 and yellow lake #6, or a mixture thereof, are blended together to provide a suggestive cheddar cheese look. Yellow lake #6 provides a more orange color, while yellow lake #5 provides a more lemon color. Other dyes or food colorings, as are known in the art, may be used.

In addition to the above ingredients, both extrudate material 12 and stuffing/striping material 14 may include a sugar and a humectant. The sugar source may include dextrose, a corn syrup including a hydrogenated corn syrup, a high fructose corn syrup, and a range of low dextrose equivalent to high dextrose equivalent corn syrups. Other sugars, such as granulated sugar, may be used.

The humectant may be any suitable humectant, for example propylene glycol and polyhydric glycols such as glycerin and sorbitol, and the like. It is understood that a combination of hydrogenated corn syrup and humectant may be used to soften the final product. As the amount of hydrogenated corn syrup and glycerin is decreased, a harder product is created that has a longer chew time. Thus, it may be desirable to increase or decrease the amount of hydrogenated corn syrup and/or glycerin, as is appropriate to achieve a desired chew time. The term "chew time" as used herein and in the appended claims is intended to indicate the period of time it would take to consume, e.g., ingest, the product.

Various functional ingredients may be included. The functional ingredients may include a vitamin, a mineral, a conjugated linoleic acid, an antioxidant, a microorganism, illustratively a probiotic, a moiety such as a metabolite or a supernatant of culture of such microorganism, an extract from a plant that may contain any of the above, a dietary supplement, or combinations and mixtures of the above. The functional ingredients individually may be included in either extrudate material 12, stuffing/striping material 14, or both. Also, if desired, abrasive agents may be included, particularly in extrudate material 12. Suitable abrasive agents include ground oyster shells, titanium dioxide, and the like. Similarly, dental care agents may also be included if desired; for example pyrophosphate salts such as tetrasodium pyrophosphate may be included.

It is understood that the term "about" as used herein and in the appended claims is intended to indicate a range of values of 10% greater and lesser than the indicated value. Thus, about 5% is intended to encompass a range of values from 4.5% to 5.5%. Further, the percentage of each ingredient reflects a percentage of the total weight of beef extrudate 12 in the finished product. The term "up to" as used herein and in the appended claims is intended to indicate a range of values from 0.0% to 5% greater than the indicated value. Therefore, up to about 7% is intended to encompass a range of values from 0.0% to 7.35%.

EXAMPLE 1

Illustrative Flow Process

Figure 11:
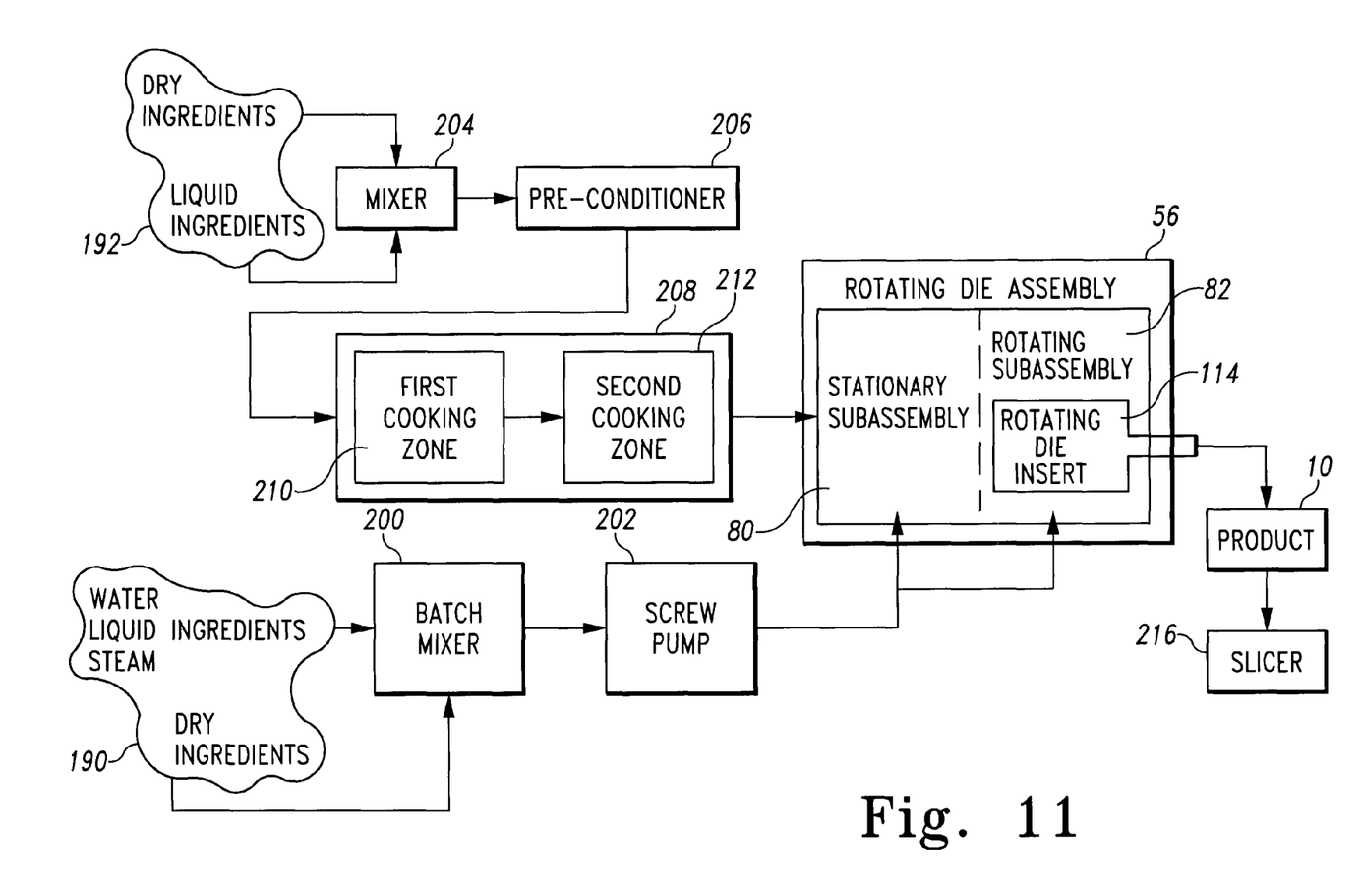
FIG. 11 illustrates a process flow diagram for producing the pet food product.

FIG. 11 is a process flow diagram that illustrates a method for producing pet treat 10, 110, as provided herein. Stuffing/striping material 14 is prepared from a protein source, a carbohydrate source, a fat source, preservatives, emulsifiers, and dyes. The liquid and dry ingredients 190 are mixed in a batch mixer 200, as shown diagrammatically in FIG. 11, where the ingredients for stuffing/striping material 14 are heated, to about 180° F. to about 210° F., to form a dough. Stuffing/striping material 14 is then fed into a screw pump 202, where it is pressurized, from about 600 psi to about 900 psi. After having been pressurized in the screw pump, stuffing/striping material 14 is fed into both stationary subassembly 80 and rotating subassembly 82 of die assembly 56.

Similarly, extrudate material 12 is prepared from a protein source, a carbohydrate source, a fat source, emulsifiers, preservatives, dyes, and flavorings. The liquid and dry ingredients 192 of extrudate material 12 are mixed together in a mixer 204, as shown diagrammatically in FIG. 11, and then fed into a preconditioner 206. In preconditioner 206, water and/or steam may be mixed into the mixed liquid and dry ingredients 192 of extrudate material 12. If desired, the temperature of extrudate material 12 may be raised in the preconditioner 206 to from about 190° F. to about 210° F. A suitable preconditioner is commercially available from Wenger Manufacturing, Inc., Sabetha, Kans.

The moistened extrudate material 12 leaving preconditioner 206 is then fed into an extruder 208. Extruder 208 may be any suitable cooking extruder. A suitable commercially available extruder may be obtained from companies such as Wenger Manufacturing, Inc., Sabetha, Kans.; Clextral S. A., Tampa, Fla.; and Bühler, Inc., Minneapolis Minn. During passage through the extruder, the moistened feed illustratively passes through several cooking zones. In a first zone 210, extrudate material 12 is heated from about 230° F. to about 260° F. In a second zone 212, extrudate material 12 is cooled to a temperature from about 180° F. to about 210° F., in preparation for forming. The pressure in the first and second cooking zones 210, 212 is from about 600 psi to about 900 psi. If desired, water or steam, or both, may be introduced into one or both of the cooking zones 210, 212. Extrudate material 12 exits extruder 208 through rotating die assembly 56. Extrudate material 12 enters stationary portion 80 of rotating die assembly 56, as discussed above, where extrudate material 12 is stuffed with stuffing/striping material 14. As the stuffed extrudate moves through rotating die assembly 56, the stuffed extrudate is twisted and striped with stuffing/striping material 14.

Upon leaving rotating die assembly 56, twisted, stuffed, and striped pet food product 10, 110 is cut into pieces using a commercial slicer 216, as is known in the art. Pet food product 10, 110 may be cut while hot, without losing the twist. In an exemplary embodiment, pet food product 10 is cut into about 6.0 inch to about 6.25 inch lengths and is approximately about 0.5 inches in cross-section, with substantially four to six twists per piece. However, other lengths, widths, and number of twists are within the scope of this invention. The individual pieces may then be processed as desired. For example they may be coated with further flavoring agents. After cooling, the pieces may be packed into suitable packages for transportation and sale to customers.

Specific examples using this flow process are now described for further illustration.

EXAMPLE 2

Twisted Stuffed Pet Food, Beef and Cheese Flavor

In one exemplary embodiment, extrudate material 12 is made to simulate beef and stuffing/striping material 14 is made to simulate cheese. Generally, the final extruded treat preferably comprises from about 10% to about 15% protein with a moisture content from about 22% to about 28%, and a fat content from about 4% to about 7% by weight.

Each component, for example the beef-flavored extrudate material 12 and the cheese-flavored stuffing/striping material 14, retains its separate characteristics in the treat. Of course variations in the composition may be needed as a result of the particular extrusion process used.

In one embodiment, the composition of the beef-like extrudate material 12 comprises from about 1% to about 8% hydrogenated corn syrup, from about 1% to about 9% glycerin, from about 3% to about 9% granulated sugar, up to 25% corn gluten, from about 2% to about 12% water, up to 17% trimmed beef gullets, up to 7% bacon fat, up to 43% ground wheat, up to 45% wheat flour, up to 2% salt, and less than 1% sorbic acid, glyceryl monostearate, calcium propionate, dehydrated cheese powder, phosphoric acid, smoke flavor, and brown dye. Optionally, the final extruded treat includes from about 1% to 10% sorbitol. In another embodiment, the final extruded treat includes from about 1% to about 10% propylene glycol. Each component retains its separate characteristics in the treat. Of course variations in the composition may be needed as a result of the particular extrusion process utilized. The percentage of each ingredient listed herein reflects a percentage of the total weight of beef-flavored extrudate material 12 in finished pet food product 10, 110

More particularly, in an exemplary embodiment, the composition of beef-flavored extrudate material 12 includes about 2% hydrogenated corn syrup, about 4% glycerin, about 4% granulated sugar, about 13% corn gluten, about 7% water, about 3% trimmed beef gullets, about 2% bacon fat, about 23% ground wheat, about 7% wheat flour, about 1% salt, less than 1% sorbic acid, less than 1% glyceryl monosterate, less than 1% calcium propionate, less than 1% dehydrated cheese powder, less than 1% phosphoric acid, less than 1% smoke flavor, and less than 1% brown lake blend dye. It is understood that these percentages reflect percentages of the finished pet food product 10, 110.

In one embodiment the composition of cheese-like stuffing/striping material 14 includes from about 1% to about 6% hydrogenated corn syrup, from about 0.5% to about 4% animal fat, from about 1% to about 6% glycerin, from about 1% to about 17% water, from about 1% to about 9% granulated sugar, from about 5% to about 30% corn starch, from about 2% to about 26% wheat flour, and less than 1% dehydrated cheese powder, emulsifier, calcium propionate, salt, sorbic acid, yellow dye, and titanium dioxide. In another embodiment, stuffing/striping material 14 includes from about 1% to about 16% hydrogenated corn syrup. In a further embodiment, stuffing/striping material 14 includes from about 1% to about 16% corn syrup. In still a further embodiment, stuffing/striping material 14 includes from about 1% to about 16% sorbitol. In an alternative embodiment, stuffing/striping material 14 includes from about 1% to about 16% glycerin. In an additional embodiment, stuffing/striping material 14 includes from about 1% to about 16% propylene glycol. In yet another embodiment, stuffing/striping material 14 includes 100% wheat flour. It is understood that the percentage of each ingredient reflects a percentage of the total weight of the cheese-like stuffing/striping material 14 in finished pet food product 10, 110.

More particularly, in one exemplary embodiment, the composition of cheese-like stuffing/striping material 14 includes about 3% hydrogenated corn syrup, about 1% tallow, about 2% glycerin, about 5% water, about 2% granulated sugar, about 13% corn starch, about 4% wheat flour, less than 1% dehydrated cheese powder, less than 1% lecithin, less than 1% calcium propionate, less than 1% salt, less than 1% sorbic acid, less than 1% yellow lake dye #6, less than 1% yellow lake dye #5, and less than 1% titanium dioxide. It is understood that these percentages reflect percentages of the finished pet food product 10, 110.

The beef-like extrudate material 12 and the cheese-like stuffing/striping material 14 are processed according to the method of Example 1. Illustratively in one embodiment, the beef-like extrudate material 12 comprises about ⅔ of the final pet food product, while the cheese-like stuffing/striping material 14 comprises about ⅓ of the final pet food product. The final pet food product has an appearance as shown in FIGS. 1-6.

EXAMPLE 3

Twisted Stuffed Pet Food, Bacon and Cheese Flavor

In one exemplary embodiment, extrudate material 12 is made to simulate bacon and stuffing/striping material 14 is made to simulate cheese. As with the beef and cheese flavor, the final extruded treat comprises from about 10% to about 15% protein with a moisture content from about 22% to about 28%, and a fat content from about 4% to about 7% by weight.

A composition similar to the beef-like extrudate material is used for the composition of the bacon-like extrudate material. In one embodiment, red lake blend replaces the brown dye, to provide a more bacon-like appearance. Optionally, the ratios of the smoke flavor and the bacon fat may be adjusted to provide a more bacon-like taste and aroma. Optionally, the same cheese-like stuffing/striping material may be used, as in Example 2.

Bacon-like extrudate material 12 and cheese-like stuffing/striping material 14 are processed according to the method of Example 1. Illustratively, in one embodiment, the bacon-like extrudate material 12 comprises about ⅔ of the final product, while the cheese-like stuffing/striping material 14 comprises about ⅓ of the final product. The final pet food product has an appearance as shown in FIGS. 1-6.

Although the invention has been described in detail with reference to certain preferred embodiments, those skilled in the art will recognize that the invention can be practiced with variations and modifications within the scope and spirit of the invention as described and defined in the following claims.

The invention claimed is:

1. A pet food product comprising
a helically twisted body having a length, the body including
a first material formed to include an outer surface and an inner surface defining a cavity therein, and
a second material having a striping portion and a stuffing portion, said striping portion deposited onto said outer surface of said first material and positioned to lie along the length of said first material and said stuffing portion positioned within said cavity of said first material and in contact with said inner surface of said first material.

2. The pet food product of claim 1 wherein said first material is chemically bonded to said second material.

3. A helically twisted pet food product comprising
a helically twisted body having a length, the body including
a first material,
a second material, and
a "Y" shaped cross-section defining three lobes of said first material, each lobe approximately 120° from its adjacent lobes, each said lobe connected to an adjacent lobe by a connecting portion of said first material, said second material provided in each of three valleys defined by said lobes, said second material provided on an exterior surface of said connecting portions.

4. The helically twisted pet food product of claim 3 wherein said connecting portions define a central channel and said second material is deposited in said central channel.

5. The helically twisted pet food product of claim 3 wherein said first material has a color and texture to resemble a first food composition selected from the group consisting of beef, bacon, chicken, turkey, pork, lamb, fish, cheese, peanut butter, fruit spread, vegetable spread, garlic spread, and herbal spread, and
said second material has a color and texture to resemble a second food composition selected from the group consisting of beef, bacon, chicken, turkey, pork, lamb, fish, cheese, peanut butter, fruit spread, vegetable spread, garlic spread, and herbal spread.

6. An extruded pet food product comprising
an extrudate material, wherein said extrudate material is helically twisted,
a stuffing/striping material, deposited on an exterior surface of said extrudate material during an extrusion process,
wherein said stuffing/striping material provides lubrication during said extrusion process.

7. The extruded pet food product of claim 6 wherein said stuffing/striping material is deposited in a central channel of said extrudate material.

8. The extruded pet food product of claim 6 wherein said stuffing/striping material is helically deposited on said exterior surface of said extrudate material to form stripes.

9. The extruded pet food product of claim 8 wherein said extrudate material has a "Y" shaped cross-section defining three lobes, each lobe approximately 120° from its adjacent lobe, and defining three valleys, each valley located between two adjacent lobes, and wherein said stuffing/striping material is deposited in each valley.

10. The extruded pet food product of claim 9 wherein
said extrudate material has a color, texture, and flavor to resemble a first food composition selected from the group consisting of beef, bacon, chicken, turkey, pork, lamb, fish, cheese, peanut butter, fruit spread, vegetable spread, garlic spread, and herbal spread, and
said stuffing/striping material has a color, texture, and flavor to resemble a second food composition selected from the group consisting of beef, bacon, chicken, turkey, pork, lamb, fish, cheese, peanut butter, fruit spread, vegetable spread, garlic spread, and herbal spread.

11. The extruded pet food product of claim 10 wherein said extrudate material comprises approximately ⅔ of said extruded food product and the stuffing/striping material comprises approximately ⅓ of said extruded food product.

12. The extruded pet food product of claim 6 wherein said extrudate material comprises hydrogenated corn syrup, glycerin, granulated sugar, corn gluten, water, trimmed beef gullets, bacon fat, ground wheat, wheat flour, salt, sorbic acid, glyceryl monostearate, calcium propionate, dehydrated cheese powder, phosphoric acid, smoke flavor, and brown lake blend dye.

13. The extruded pet food product of claim 6 wherein said stuffing/striping material comprises hydrogenated corn syrup, fat, glycerin, water, granulated sugar, corn starch, wheat flour, dehydrated cheese powder, emulsifier, calcium propionate, salt, sorbic acid, yellow lake dye #6, yellow lake dye #5, and titanium dioxide.

14. The extruded pet food product of claim 13 wherein said fat comprises at least one material selected from the group consisting of beef fat, lamb fat, tallow, poultry fat, pork fat, vegetable oil, soybean oil, corn oil, cottonseed oil, sunflower oil, canola oil, peanut oil, and safflower oil.

15. The extruded pet food product of claim 13 wherein said emulsifier comprises at least one compound selected from the group consisting of monoglyceride, diglyceride, glyceryl esters, polysorbates, sorbitan esters, stearoyl lactylates, sucrose esters, and propylene glycol esters of fatty acids.

16. The extruded pet food product of claim 6 wherein said extrudate material is extruded without concomitant cooling during said extrusion process.

* * * * *